July 19, 1960 J. L. MEDOFF 2,945,967

LOAD SWITCHING CIRCUIT

Filed Dec. 12, 1957

INVENTOR.
JOSEPH L. MEDOFF

BY Thomas O. Herbert

AGENT

United States Patent Office 2,945,967
Patented July 19, 1960

2,945,967

LOAD SWITCHING CIRCUIT

Joseph L. Medoff, Cambridge, Mass., assignor to Burroughs Corporation, Detroit, Mich., a corporation of Michigan Filed Dec. 12, 1957, Ser. No. 702,412

3 Claims. (Cl. 307—112)

This invention relates to switching circuits and more particularly to circuit arrangements for switching from one load device to another.

It is often desirable to have a circuit for switching a current from one load to another without having a substantial change in the current as applied to the two loads. This is especially true in digital data handling systems where it is often necessary to switch between two output circuits, the control device being the presence or absence of a signal. An example of the two output circuits is a pair of lights used for energizing one or more phototubes. An example of an input circuit which has two values depending upon the presence or absence of a signal is a punched tape where the presence can represent "1," and the absence, "0." Such switching has been accomplished in the past by (1) the provision of a double throw switching device such as a relay or multivibrator being switched by an input such as a trigger circuit, or (2) the provision of a bridge network with equalizing resistances so as to compensate for the different voltage when current goes first through the arms and second through the bridge. In computer circuitry which often utilizes a binary system, the use of relays or even additional switches is often too slow for the desired computing speed. Also the use of compensating resistances is often expensive and bulky in a given circuit arrangement.

It is, therefore, an object of my invention to simplify switching devices.

It is also an object of my invention to provide a load switching device which is fast enough to fulfill the needs of computer circuitry and is at the same time small, simple and inexpensive.

It is another object of my invention to provide a circuit for switching current from one load device to another without changing the current during the switching.

It is still another object of my invention to provide a load switching device to simultaneously change the conductive state of each of two current consuming devices in an opposing relationship with each other.

The foregoing objects of my invention are achieved by the use of only two resistors and a unidirectional current flow device or diode. One of the resistors is placed in series with each of two loads to be alternately supplied and the two loads are thus placed across a supply of voltage. A switch is placed in one of the load circuits and between the switch and the load, the diode is connected. The other side of the diode is connected between the other load and its respective resistor. The diode is connected so as to provide its high impedance path through both of the load devices. In operation, when the switch is closed, the diode effectively shorts out the second load and current passes through the first load to ground through the switch. When the switch is open, the second load is no longer shorted out and current passes through that load while current cannot pass through the first load due to the open switch and the high back-resistance of the diode.

A more detailed description of my invention follows in conjunction with the accompanying drawing in which.

Figure 1:
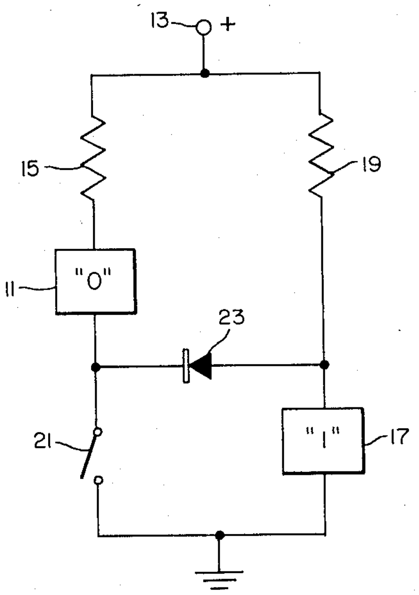
Figure 1 is a schematic diagram of an improved load switching device.

Referring to Fig. 1, there is a first load device 11 which can be a light bulb, relay or other current consuming device which is to be switched on and off as a function of some outside source. The load device 11 is connected to a source of positive potential 13 through a resistor 15. A second load device 17 which can be of a nature similar to that of the first load device 11 or it can be some alternative nature. The second load device is also to be switched on and off as a function of the same outside source. However, the second load device 17 is to be switched off while the first load device 11 is on and vice versa. The second load device 17 is connected to the source of positive potential 13 through a resistor 19. The other side of the second load device 17 is returned to ground while the remaining side of the first load device 11 is connected to a switching means 21.

This switching means 21 may be any type of on-off device such for example as a manual knife switch, multivibrator or trigger circuit. A diode 23 is connected between the junctions of the resistor 19 with the second load device 17 and of the first load device 11 with the switching means 21. This diode device can be any of the well-known semiconductor devices having an asymmetrical voltage current characteristic. Also it could well be a diode-type vacuum tube or a selenium, germanium or other type rectifier, the important quality being the non-linear current flow characteristic. With the non-linear current flow characteristic, current can flow with ease in one direction but is highly impeded in the backward direction, the low impedance direction being called the forward and the high impedance being called the backward currents.

The arrangement of the diode 23 in the circuit of Fig. 1 is such that its forward direction is from the source of positive potential 13, through the resistor 19, through the diode 23 and finally through the switching means 21 to ground. In operation, the circuit is more easily described in conjunction with Figs. 2 and 3 wherein the individual components are designated by the same reference numerals as in Fig. 1.

Figure 2:
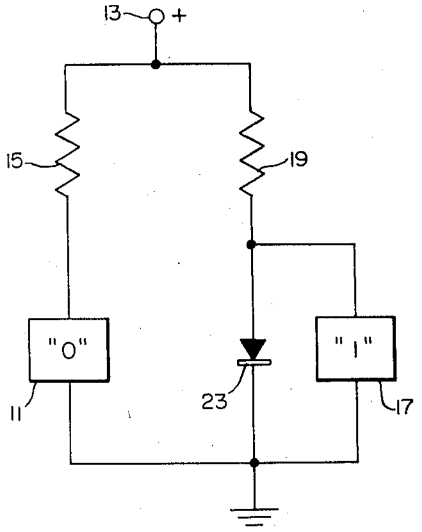
Figure 2 is a simplified drawing of the load switching device with the switch closed.

First considering Fig. 2, the switching means 21 is in its closed position, and the resistance 15 and the load device 11 are in series relationship across the voltage supply thereby allowing a definite amount of current to flow through the load device 11. This current is limited by the value of resistance 15 and also by the value of the resistive element of the load device 11. At the same time, the resistor 19 and the parallel combination of the load device 17 and the diode 23 are in series across the same source of potential. Current through this series circuit is limited by the value of the resistance 19 and the resistive value of the parallel combination of the load device 17 and the diode 23. By choosing the value of the diode's forward resistance to be relatively low compared with the resistive element of the second load device 17 substantially all of the current through this series bank will pass through the diode 23 and the load device 17 will be in its off state.

Figure 3:
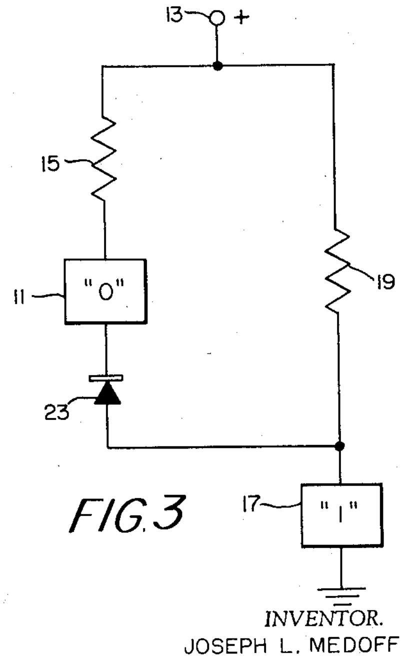
Figure 3 is a simplified drawing of the load switching device with the switch open.

Considering Fig. 3, the switch 21 is in its open state. With this configuration, the resistor 19 and the second load device 17 are in series across the source of potential whereby the current is limited by the resistive element of the load device 17 and the parallel network of the resistance 19 in conjunction with the resistance 15, the resistive element of the load device 11 and the back resistance of the diode 23.

The values of the resistors 15 and 19 can be chosen such as to provide the current in the load device 17 while the switch is open equal to the current in the load device 11 while the switch 21 is closed. In a sample calculation for deriving these values of resistance, it can be assumed that the diode is a 1N91 having a forward resistance of 20 ohms and a back resistance of 100 kilohms. Also assume that a GE "grain of wheat" bulb is used for each of the load devices and the bulb requires 43 milliamps at 28 volts (640 ohms). Also assume a source of potential of 100 volts. Let $I_1$ equal the current through the resistor 15 and the first load device 11 when the switch 21 is closed. Let $R_1$ equal the value of the resistor 15, $R_2$ equal the value of the resistor 19 and let $R_L$ equal the value of the resistive elements of each of the load devices 11 and 17 and $R_B$ equal the value of the back resistance of the diode 23. Let E equal the source of potential voltage.

Then since $$I_1=\frac{E}{R_1+R_L}$$

or $$R_1=\frac{E}{I_1}-R_L$$

$$=\frac{100}{.043}-640$$

$$R_1=1670 \text{ ohms}$$

Since the current through the second load device 17 is to be the same as that through the first load device 11, the value of the network of the resistor 19 in parallel with the series arrangement of the resistor 15, the resistive element of the load device 11 and the back resistance of the diode 23 must be equal to the value of the resistor 15. Therefore:

$$R_1=\frac{R_2(R_1+R_L+R_B)}{R_2+R_1+R_L+R_B}$$

$$1670=\frac{R_2(1670+650+100{,}000)}{R_2+1670+650+100{,}000}$$

$$R_2=1670 \text{ ohms}$$

The above calculations are but for a single embodiment of the invention. The values of the various elements are by no means limited to those as mentioned. Nor are the particular components limited to the types of components mentioned above but only to those limitations as set out in the claims below.

I claim:

1. A load switching device comprising a bridge network having a first serial arm including a switching means, a second serial arm including a first load device and a first impedance, a third serial arm including a second impedance, a fourth serial arm including a second load device, a source of unidirectional potential connected between the junctions of said first with said fourth serial arms and said second with said third serial arms, and a bridge arm including a non-linear current flow device connected between the junctions of said first with said second serial arm and said third with said fourth serial arm, said non-linear device being connected with its current carrying terminals in series with said switching means and said second impedance to provide the lowest resistance to current flow through said switching means and said second impedance, wherein with said switching means in a closed position current flow is preponderantly from said source through said first load device and said switching means, and with said switching means in an open position the current flow is preponderantly through said second load device.

2. A load switching circuit comprising a source of unidirectional potential, a first load and a first resistance connected in series across said source of potential, a switching means, a second load and a second resistance also connected in series across said source of potential in the order named, said second resistance being connected to the same terminal of said source of potential as is said first resistance, an asymmetrical voltage-current flow characteristic device having two terminals connected between the junction of said first load with said first resistance and the junction of said second load with said switching means, said asymmetrical device oriented to provide its lower resistance path to said source of unidirectional potential through said first resistance and said switching means, wherein with said switching means in a closed position, current flow is preponderantly from said source through said second load device and said switching means, and with said switching means in an open position, the current flow is preponderantly through said first load device.

3. A load switching circuit comprising a source of unidirectional potential, a first and a second resistance connected to the positive terminal of said source of potential, a first and a second load device connected respectively to said first and second resistance, said first load being connected to the negative terminal of said source, a switching means connecting said second load device to the negative terminal of said source, an asymmetrical voltage-current flow characteristic semiconductor device with two main current carrying terminals, said current carrying terminals being connected between the junction of said first load device with said first resistance and the junction of said second load device with said switching means, said semiconductor device oriented to provide its low resistance path to said source of unidirectional potential through said first resistance and said switching means, wherein when said switching means is in a closed position, current flow is preponderantly from said source through said second load device and said switching means, and when said switching means is in an open position, the current flow is preponderantly through said first load device.

References Cited in the file of this patent

UNITED STATES PATENTS 2,829,281 Overbeek ............... Apr. 1, 1958